US009008047B2

(12) United States Patent
Kanamarlapudi et al.

(10) Patent No.: US 9,008,047 B2
(45) Date of Patent: Apr. 14, 2015

(54) METHODS AND APPARATUSES FOR IMPLEMENTING A MULTI-RAB MINIMUM TFC DETERMINATION ALGORITHM BASED ON TRANSMIT POWER

(75) Inventors: Sitaramanjaneyulu Kanamarlapudi, San Diego, CA (US); Liangchi Hsu, San Diego, CA (US); Rajasekar Arulprakasam, San Diego, CA (US); Yi Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 13/563,961

(22) Filed: Aug. 1, 2012

(65) Prior Publication Data

US 2013/0194945 A1   Aug. 1, 2013

Related U.S. Application Data

(60) Provisional application No. 61/588,331, filed on Jan. 19, 2012, provisional application No. 61/588,026, filed on Jan. 18, 2012.

(51) Int. Cl.
*H04B 7/216* (2006.01)
*H04W 72/02* (2009.01)
*H04W 52/36* (2009.01)
*H04W 76/02* (2009.01)

(52) U.S. Cl.
CPC .............. *H04W 72/02* (2013.01); *H04W 76/02* (2013.01); *H04W 52/367* (2013.01)

(58) Field of Classification Search
CPC . H04W 72/1284; H04W 28/22; H04W 76/02; H04B 7/2628
USPC ................................... 370/329, 335, 342, 468
See application file for complete search history.

(56) References Cited

U.S. PATENT DOCUMENTS 7,647,066 B2   1/2010   Takahashi et al.
(Continued)

FOREIGN PATENT DOCUMENTS

WO   2004059869 A1   7/2004
WO   2005039115 A1   4/2005

OTHER PUBLICATIONS

3GPP TS 25.133 V10.0.0 (Dec. 2012); 3rd Generation Partnership Project; Technical Specification Group Radio Access Network; Requirements for support of radio resource management; (FDD), Dec. 2012, Release 10.
(Continued)

*Primary Examiner* — Raj Jain
(74) *Attorney, Agent, or Firm* — Darren M. Simon

(57) ABSTRACT

In an aspect of the present disclosure, presented is a method for wireless communication that includes obtaining at least one transport format combination (TFC), determining a minimum TFC (MinTFC) mode based on at least one TFC state of at least one TFC inside or outside a MinTFC set, and controlling at least one TFC based on the MRAB MinTFC mode. Through this method, pack-switched transmission power can be managed in a manner that will cause a circuit-switched call to function properly in challenging power conditions.

48 Claims, 12 Drawing Sheets

(56) References Cited

U.S. PATENT DOCUMENTS

| | | |
|---|---|---|
| 7,920,890 B2 | 4/2011 | Iwata |
| 8,320,307 B2 * | 11/2012 | Niwano .................. 370/329 |
| 2005/0069044 A1 | 3/2005 | Iacono et al. |
| 2005/0243762 A1 | 11/2005 | Terry et al. |
| 2006/0062193 A1 * | 3/2006 | Choi et al. .................. 370/342 |
| 2006/0072503 A1 * | 4/2006 | Kim et al. .................. 370/329 |
| 2008/0159184 A1 | 7/2008 | Niwano |
| 2009/0280822 A1 * | 11/2009 | Ericson et al. ............ 455/452.2 |

OTHER PUBLICATIONS

3GPP TS 25.321 V10.5.0 (Dec. 2011); 3rd Generation Partnership Project; Technical Specification Group Radio Access Network; Medium Access Control (MAC) protocol specification, Dec. 2011, Release 10.
International Search Report and Written Opinion—PCT/US2013/022192—ISA/EPO—Apr. 25, 2013.

* cited by examiner

METHODS AND APPARATUSES FOR IMPLEMENTING A MULTI-RAB MINIMUM TFC DETERMINATION ALGORITHM BASED ON TRANSMIT POWER

CLAIM OF PRIORITY UNDER 35 U.S.C. §119

The present Application for Patent claims priority to Provisional Application No. 61/588,331 entitled "Apparatus and Methods of Operating in a Power Limited Mode for Multiple Radio Bearer Communications" filed Jan. 19, 2012, and assigned to the assignee hereof and hereby expressly incorporated by reference herein. Additionally, present Application for Patent claims priority to Provisional Application No. 61/588,026 entitled "Apparatus and Methods of Operating in a Power Limited Mode for Multiple Radio Bearer Communications" filed Jan. 18, 2012, and assigned to the assignee hereof and hereby expressly incorporated by reference herein.

BACKGROUND

1. Field

Aspects of the present disclosure relate generally to wireless communication systems, and more particularly to determining a power limited mode for operating a device.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Furthermore, UMTS supports multiple radio access bearer (multi-RAB) capability, which simultaneous network communication with a user equipment (UE) over two or more radio access bearers. Therefore, multi-RAB functionality in UMTS allows for a user equipment to concurrently transmit and receive packet-switched and circuit-switched data.

In some wireless networks, a device can utilize transport format combinations (TFC) for associating to transport channels for communicating with one or more base stations. The TFCs can employ associated states, such as a supported state, excess power state, or blocked state, to indicate whether the device can communicate over a transport channel based on the associated TFC. State transitioning for the TFCs is defined such that the state for a period of time is determined based on slot level transmit power measurements over multiple previous periods of time. Thus, it is possible that a state for a given TFC can fluctuate between a supported state and an unsupported state (e.g., excess power or blocked), where the slot level transmit power measurements fluctuate across a threshold defined for determining the supported or unsupported state. This can result in a TFC being set to a supported state where transmit power may not be at the threshold to operate in such a supported state, which can cause a reset in the radio link control (RLC) layer, referred to as an RLC reset, and eventually RLC unrecoverable errors. This also may cause a call drop for a circuit-switched (CS) call and a packet-switched (PS) call.

There are multiple techniques to limit the data associated with a PS call during power limited conditions or challenging radio conditions to ensure that a CS call will not be dropped. For example, one technique includes limiting the PS traffic based on non-minimum set TFCs being in an excess power or blocked state. The typical prior art solutions are not efficient, however, as they tend to unnecessarily block all PS traffic. Thus, improvements in controlling transmission states of TFCs are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to aspects of the present disclosure, a method for wireless communication is provided herein that includes obtaining a transport format combination (TFC) state of each of one or more TFCs associated with a user equipment, wherein at least one TFC of the one or more TFCs comprises a minimum TFC (MinTFC) set, determining whether a multiple radio access bearer (MRAB) MinTFC condition exists for operating a user equipment in a MRAB MinTFC mode based on the TFC state of at least one TFC, and controlling transmission associated with the at least one TFC of the MinTFC set based on whether the MRAB MinTFC condition exists.

Further provided herein is an example apparatus for wireless communication, which includes means for obtaining a transport format combination state of each of one or more TFCs associated with a user equipment, wherein at least one TFC of the one or more TFCs comprises a minimum TFC set, means for determining whether a multiple radio access bearer MinTFC condition exists for operating a user equipment in a MRAB MinTFC mode based on the TFC state of at least one TFC, and means for controlling transmission associated with the at least one TFC of the MinTFC set based on whether the MRAB MinTFC condition exists.

In addition, the present disclosure presents aspects of an example computer-readable medium comprising stored code for obtaining a transport format combination state of each of one or more TFCs associated with a user equipment, wherein at least one TFC of the one or more TFCs comprises a minimum TFC set, determining whether a multiple radio access bearer MinTFC condition exists for operating a user equipment in a MRAB MinTFC mode based on the TFC state of at least one TFC, and controlling transmission associated with the at least one TFC of the MinTFC set based on whether the MRAB MinTFC condition exists.

Moreover, the description to follow further teaches an example apparatus for wireless communication, which includes a transport format combination obtaining component configured to obtain a TFC state of each of one or more TFCs associated with a user equipment, wherein at least one TFC of the one or more TFCs comprises a minimum TFC set, an multiple radio access bearer MinTFC mode determining component configured to determine whether an MRAB MinTFC condition exists for operating a user equipment in a MRAB MinTFC mode based on the TFC state of at least one TFC, and a TFC controlling component configured to control transmission associated with the at least one TFC of the MinTFC set based on whether the MRAB MinTFC condition exists.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
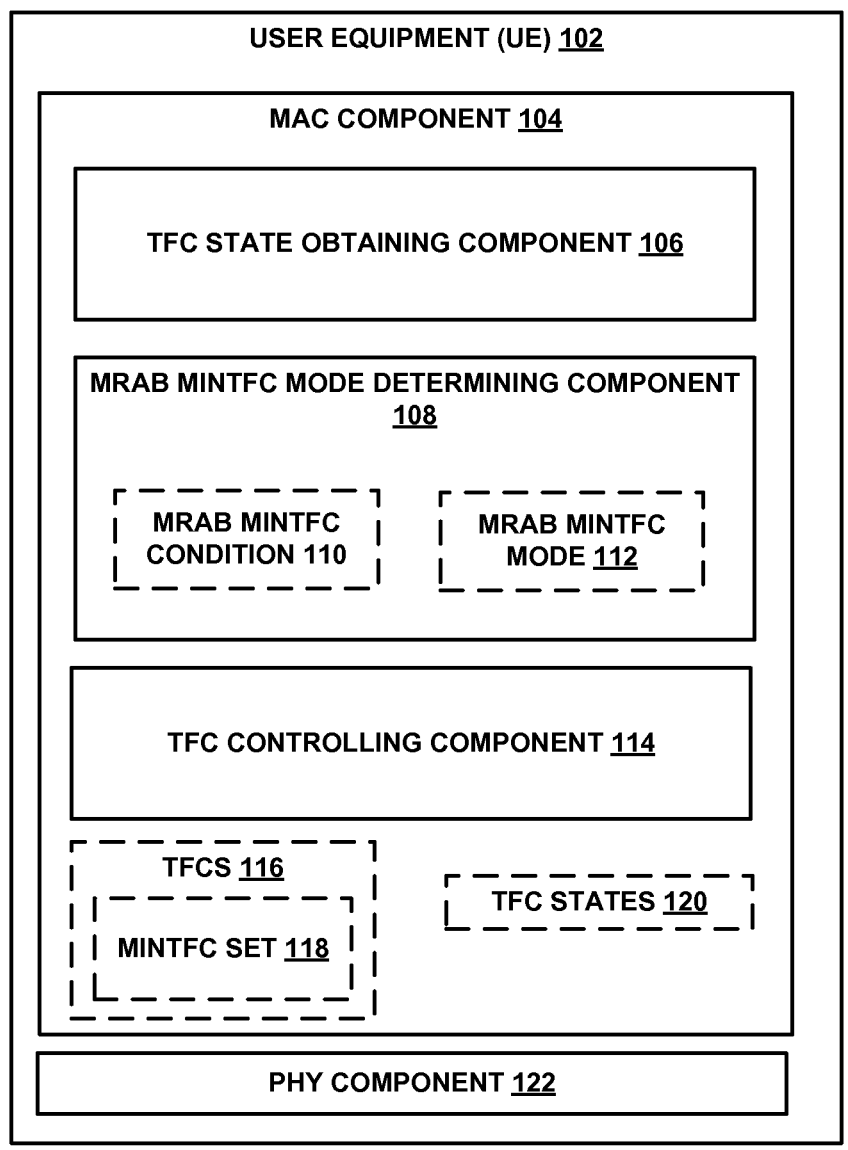
FIG. 1 is a block diagram of an example UE for achieving power management by controlling packet-switched TFCs in the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The apparatus and methods described herein relate to operating a device in a power limited state in order to avoid a call drop of a circuit-switched (CS) call. The device can utilize multiple transport format combinations (TFC) for associating to one or more transport channels, and the TFCs can have associated operating states determined and switched at a physical layer. Further, each TFC corresponds to a CS radio bearer (RB) or a packet-switched (PS) RB. In addition, a minimum TFC (MinTFC) set is defined as a portion of the TFCs for which communication is allowed in the power limited mode, and the MinTFC set may include a set of PS RBs and a set of CS RBs. In an example, the device can determine whether to operate in a power limited or multiple radio access bearer (MRAB) MinTFC mode at a media access control (MAC) layer, wherein in the MRAB MinTFC mode the MAC layer allows certain packets associated with certain TFCs in the MinTFC set to pass to the physical (PHY) layer for transmission from the device while not allowing, e.g. blocking, certain packets associated with TFCs inside the MinTFC set and all TFCs outside of the MinTFC set to reach the PHY layer.

Specifically, the apparatus and methods described herein determine whether to operate in the MRAB MinTFC mode by evaluating a state of the TFCs in the MinTFC set. For instance, the device determines whether a MRAB MinTFC condition exists that triggers operating in the MRAB MinTFC mode. In particular, in one aspect, the device may determine that the MRAB MinTFC condition exists when, in the MinTFC set, all of the packet-switched (PS) radio bearer (RB) TFCs having non-zero packet data units (PDUs) are in an excess power, blocked, or other inoperable or restricted state. In other words, the apparatus and methods determine the MRAB MinTFC condition regardless of the TFC states of the TFCs outside of the MinTFC set. Conversely, in an aspect, the device may determine that the MRAB MinTFC condition does not exist when, in the MinTFC set, at least one PS RB TFC having a non-zero PDU is in a supported state. If the MRAB MinTFC condition does exist, then the apparatus and methods operate the device in the MRAB MinTFC mode, which in this aspect includes not allowing or blocking all of the PS RB TFCs having at least one PDU, as well as not allowing or blocking all TFCs outside of the MinTFC set. If the MRAB MinTFC condition does not exist, then the apparatus and methods operate the device in a non-MRAB MinTFC mode, which in this aspect includes allowing all TFCs, e.g. all TFCs within and outside of the MinTFC set. Accordingly, operating in the MRAB MinTFC mode allows the device to avoid radio link control (RLC) reset or other outage conditions caused by attempting to transmit more data than allowed based on a current available transmit power.

In other words, the described apparatus and methods help to ensure that PS traffic is blocked based on the allowed power on the PS non-zero PDU TFCs in the MinTFC set, which provides a more accurate uplink (UL) transmit capability assessment when the device is in a power limited condition. In this manner, even though TFCs outside of the MinTFC set are blocked, PS RB PDUs are still transmitted as long as there is sufficient power for the PS traffic that is included in the MinTFC set TFCs. Therefore, PS traffic is blocked to save a CS call in power challenging radio conditions only when the UL transmit power is not sufficient for the PS RB TFCs which are included in the MinTFC set.

Referring to FIG. 1, in one aspect, a wireless communication system 10 includes a user equipment (UE) 102 for communicating in a wireless network. For example, the UE 102 can communicate with a Node B and/or Radio Network Controller (RNC), and can be substantially any type of UE, modem (or other tethered device), a Node B, relay, a portion thereof, etc., that communicates with one or more components of a wireless network. UE 102 includes a PHY component 122 for transmitting and/or receiving packets over a PHY layer, and a MAC component 104 for controlling communication through PHY component 122. For example, UE 102 can have additional layers as well to facilitate network communication, such as a radio link control (RLC) layer, a protocol layer, an application layer, etc., which are not depicted for ease of explanation.

PHY component 122 can implement a plurality of transport channels associated with TFCs 116 from which MAC component 104 can select for associating a logical channel with one or more of the transport channels. For example, each TFC can support one or more types of data traffic according to one or more parameters. In addition, MAC component 104 can manage TFC states 120 that correspond to each of the TFCs. The states can include operable, inoperable, restricted, or other states that define whether MAC component 104 allows data from channels or flows corresponding to the associated TFC to pass to PHY component 122. In one specific example, the states can include supported, excess power, and blocked states, as described further herein. In this example, PHY component 122 can perform slot level transmit power measurements, which MAC component 104 can use in determining state transitioning for the TFCs 116. For example, where at least a portion of slot level transmit power measurements over a specified time period are below a power threshold for one or more of the TFCs 116, MAC component 104 can switch corresponding TFC states 120 to excess power or blocked states, and/or vice versa where the transit power measurements achieve the power threshold.

MAC component 104 can include a TFC state obtaining component 106 for receiving a state of one or more TFCs, and a MRAB MinTFC mode determining component 108 for determining whether to operate in a MRAB MinTFC mode. For example, the MRAB MinTFC mode determining component 108 may determine whether to operate in the MRAB MinTFC mode or the non-MinTFC or other normal operating mode by testing a MinTFC condition, which is based on the state of the one or more TFCs 116. Additionally, MAC component 104 can include a TFC controlling component 114 for allowing or not allowing, e.g., blocking, communications for certain TFCs to the PHY component 122 based on whether the UE 102 operates in the MRAB MinTFC mode. Moreover, MAC component 104 can manage TFC states 120 for one or more TFCs 116, as described further herein. In addition, the TFCs 116 can include a MinTFC set 118, which can include a set of the TFCs 116 related to yielding a predictable result for an algorithm defined to select one or more of the TFCs 116 for one or more logical channels, as described further herein.

According to an example, TFC state obtaining component 106 can obtain one or more TFC states 120 of one or more corresponding TFCs 116. As described, the TFC states 120 can be managed by the MAC component 104 for passing related communications to PHY component 122. In one example, the obtained TFC states 120 of one or more corresponding TFCs 116 can correspond to a plurality of states of TFCs of a MinTFC set 118, the TFCs outside of the MinTFC set 118, or another subset of TFCs. In addition, the TFC states 120 can correspond to a plurality of states for the set of TFCs 116 over a period of time (e.g., over prior measurement periods or other time transmit intervals (TTI)). In one example, TFC state obtaining component 106 can obtain the TFC states during the prior measurement periods and store a number of TFC states of the TFCs in the set for subsequent use. Upon obtaining the one or more TFC states, MRAB MinTFC mode determining component 108 can compute a MRAB MinTFC condition 110 based on the one or more TFC states 120 for determining whether to operate UE 102 in a MRAB MinTFC mode 112.

For example, where MRAB MinTFC mode determining component 108 determines to operate UE 102 in the MRAB MinTFC mode 112, TFC controlling component 114 can filter out or otherwise restrict or block data related to at least a portion of the TFCs 116 from reaching the PHY component 122 (e.g., TFCs outside of the MinTFC set 118). In one example, such filtering can assist in avoiding RLC reset or other radio outage conditions that can be caused by PHY component 122 attempting to transmit data without the requisite transmission power available. In a specific example where MRAB MinTFC mode determining component 108 determines to operate UE 102 in the MRAB MinTFC mode 112, TFC controlling component 114 can control data related to TFCs 116. For example, this can include TFC controlling component 114 blocking or otherwise not allowing data related to TFCs to pass to the PHY component 122. When not operating in the MRAB MinTFC mode 112, TFC controlling component 114 need not filter data, or at least can allow data related to some or all of the TFCs 116 to pass to the PHY layer.

In an example, MRAB MinTFC mode determining component 108 can determine whether to operate UE 102 in the MRAB MinTFC mode 112 (e.g., switch to/from the MRAB MinTFC mode 112 from/to a normal or non-MRAB MinTFC mode) based on a MRAB MinTFC condition 110. For example, the MRAB MinTFC mode determining component 108 can compute the MRAB MinTFC condition 110 based on analyzing a plurality of TFC states 120 of at least one of the TFCs 116. For example, MRAB MinTFC mode determining component 108 can obtain one or more TFC states 120 for each TFC 18 inside the MinTFC set 118. In such an example, if all TFC states 120 of each of the TFCs in the MinTFC set 118 indicates an excess power or blocked state, MRAB MinTFC mode determining component 108 can compute the MRAB MinTFC condition 110 as true, and thus determine to operate UE 102 in the MRAB MinTFC mode 112. This can include switching the UE 102 to the MRAB MinTFC mode 112 where the UE 102 is currently operating in a different mode (e.g., a non-MRAB MinTFC mode).

Moreover, in an example, MRAB MinTFC mode determining component 108 can switch out of MRAB MinTFC mode as a result of computing the MRAB MinTFC condition 110 as false based on whether at least one TFC 18 inside of the MinTFC set 118 is in a supported state. For example, while operating in a MRAB MinTFC mode, TFC state obtaining component 106 can obtain the number of TFC states 120 corresponding to the at least one TFC 18 inside the MinTFC set 118. MRAB MinTFC mode determining component 108 can determine whether any of the obtained TFC states 120 indicate a supported mode for those TFCs in the MinTFC set 118. If so, MRAB MinTFC mode determining component 108 can compute the MRAB MinTFC 25 condition as false. Thus, where UE 102 is currently in the MRAB MinTFC mode 112, MRAB MinTFC mode determining component 108 can deactivate the MRAB MinTFC mode 112 or otherwise switch the UE 102 to a non-MinTFC or other normal mode.

Moreover, in an example, MRAB MinTFC mode determining component 108 can compute the MRAB MinTFC condition 110 as false based on whether at least one TFC 18 outside of the MinTFC set 118 is in a supported state for a number of consecutive measurement periods (e.g., or TTIs). For example, TFC state obtaining component 106 can obtain the number of TFC states 120 corresponding to the last successive measurement periods of at least one TFC 18 outside of the MinTFC set 118. MRAB MinTFC mode determining component 108 can determine whether the obtained TFC states 120 each indicate a supported mode. If so, MRAB MinTFC mode determining component 108 can compute the MRAB MinTFC 25 condition as false. Thus, where UE 102 is currently in the MRAB MinTFC mode 112, MRAB MinTFC mode determining component 108 can deactivate the MRAB MinTFC mode 112 or otherwise switch the UE 102 to a non-MRAB MinTFC or other normal mode. In one example, the number of TFC states 120 of the immediately preceding successive measurement periods, C, can be defined as a fixed or variable number. In one example, C=20.

For example, the effect of the above implementation, where A=10, B=20, and C=20, is as follows. UE 102 does not move into MRAB MinTFC mode 112 unless 50% of the time the TFCs of the UE 102 are in excess power state in the last 20 time transmit intervals (TTIs). Also, UE 102 does not move out of MRAB MinTFC mode 112 unless 100% of the time the TFCs of the UE 102 are in supported state in the last 20 TTIs. It should be noted that the above implementation is but one example, and should not be construed as limiting, as A, B, and C may have many different values.

Previous implementations defined a MinTFC mode based on TFC states without consideration of multiple TFC states per TFC over a period of time. In such implementations, for example, the MinTFC mode was activated where the TFCs 116 outside of the MinTFC set 118 were in an excess power or blocked state. The MinTFC mode was deactivated where at least one TFC 18 outside of the MinTFC set 118 was in a supported state. This caused a possibility of ping-pong between activating/deactivating MinTFC mode every 20 ms where one or more of the TFCs switched state. The described apparatus and methods, which add the consideration over multiple successive measurement periods for determining whether to operate in the MRAB MinTFC mode, alleviate this ping-pong effect.

Figure 2:
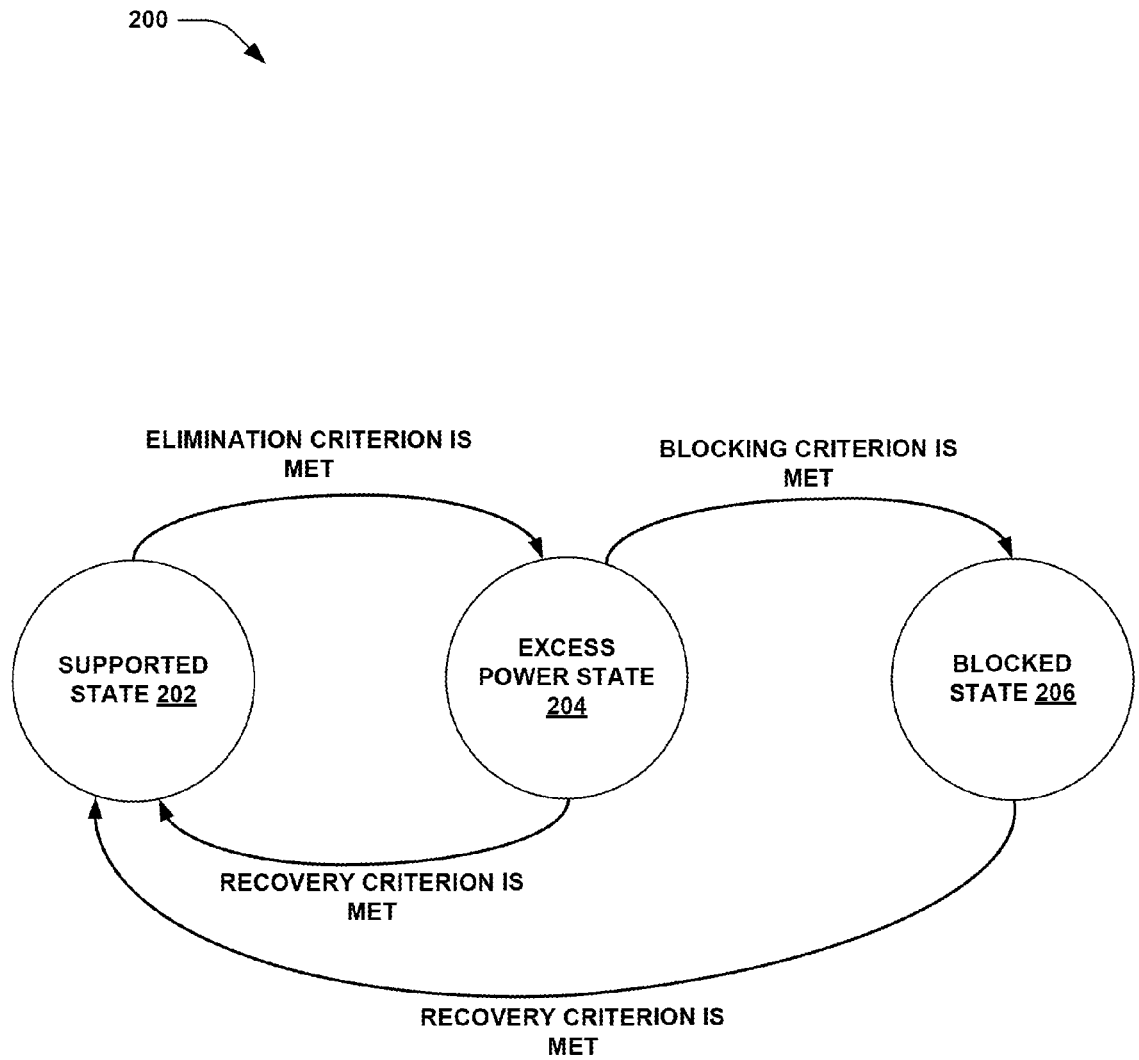
FIG. 2 is a TFC state transition diagram for TFCs in a traditional wireless network.

In FIG. 2, various operational states 200 of a TFC, in one example, are depicted. States 200, which can be implemented for TFCs at a PHY layer, include a supported state 202, an excess power state 204, and a blocked state 206. If a TFC is in a supported state, its PDUs are transmitted. If the TFC is in a blocked state, however, its PDUs are blocked because not enough power is available for PDU transmission without compromising the quality of other TFCs on the device. In an excess power state, TFCs may be prioritized based on certain factors, resulting in some TFCs being transmitted while others are blocked. It is to be appreciated that other states can be provided as well having varying levels of operability or restriction. For example, the PHY layer can allow communications for a TFC in the supported state 202. In another example, the PHY layer can allow communications for a TFC in an excess power state 204 where transmit power available at a corresponding UE achieves at least a threshold power. In addition, for example, the PHY layer can disallow communications for a TFC in a blocked state 206.

According to an example, states (e.g., TFC states 120) can be switched for a TFC (e.g., TFCs 116) based on one or more criterion. In an example, a TFC operating in supported state 202 can transition to excess power state 204 when an elimination criterion is met. For example, the elimination criterion can relate to a slot level transmit power measurement threshold, such that where the slot level transmit power measurement does not meet the threshold (e.g., for a period of time), the TFC can be moved to the excess power state 204. A TFC in an excess power state 204 can move to a blocked state 206 when a blocking criterion is met, or back to supported state 202 when a recovery criterion is met. The criteria can be similar to the elimination criterion, for instance. A TFC in a blocked state 206 can move to the supported state 202 if a recovery criterion is met.

In a specific example, X, Y, and Z can be defined to control transition of the TFC state 20 of the TFC 116 between the support and excess power states. Further, the factors $T_{notify}$, $T_{adapt}$, $T_{L1\_PROC}$ which are defined in 3GPP TS 25.133, a publication of the Third Generation Partnership Project (3GPP), can be defined to control the transition of the TFC state 120 of the TFC 116 between the excess power and blocked state. In an example, $T_{notify}$=15 ms, $T_{adapt}$=0 (or 40 ms, if circuit switched (CS) or circuit switched packet switched radio access bearer (CS_PS RAB) is configured), and $T_{L1\_PROC}$=15. This results in the following possible scenarios.

1. A TFC can fluctuate between Support State 202 and Excess Power State 204 as below:
   A. Support State 202 to Excess Power State 204—Once every 20 ms (X=15, Y=30); or
   B. Excess Power State 204 to Support State 202—Once every 20 ms (Z=30).

2. A TFC can fluctuate between Excess Power State 204 and Blocked State 206 as below:
   A. Excess Power State 204 to Blocked State 206—every 70 ms in multiple radio access bearer (MRAB) case; or
   B. Blocked State 206 to Excess Power State 204—There is no transition.

Figure 3:
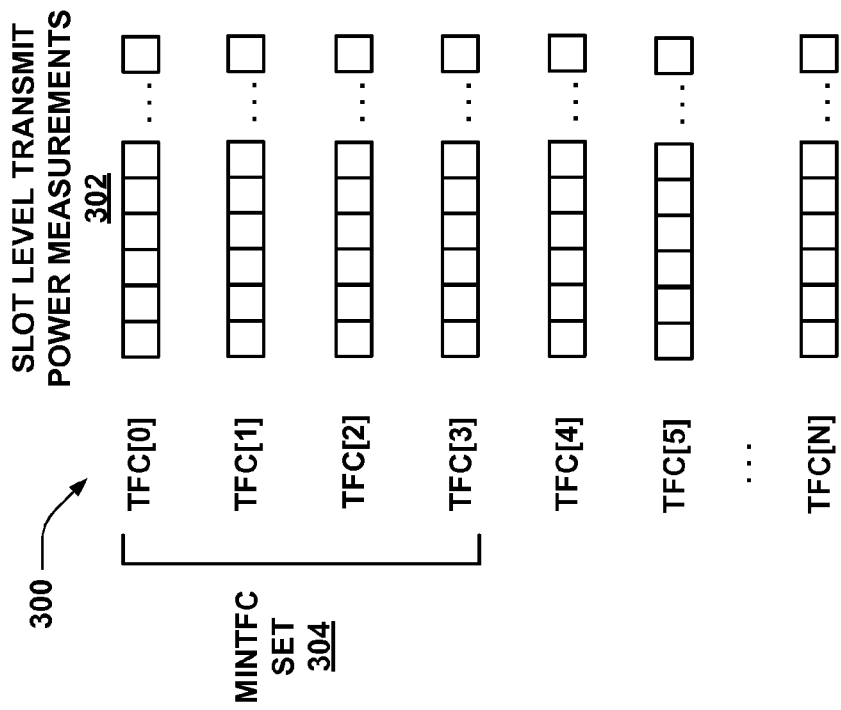
FIG. 3 is a diagram showing various TFCs inside and outside of a MinTFC set as one aspect of components of the UE of FIG. 1.

Referring to FIG. 3, in one aspect, a plurality of TFCs 116 are depicted with a representation of corresponding slot level transmit power measurements 302. The TFCs 116 include TFC[0]-TFC[n], where n is a positive integer. As described, the TFCs 116 can include a defined MinTFC set 118, which is a subset of all TFCs 116, and which in this case includes the first four TFCs (e.g., TFC[0]-TFC[3]). Based on the slot level transmit power measurements 302 as compared to a threshold for each TFC, as described above with respect to FIG. 2, the PHY component 122 can determine a state for operating the TFCs in the PHY layer. Based on the states of the TFCs 116 relative to a MRAB MinTFC condition, as described above with respect to FIG. 1, the MAC component 104 can determine whether or not to operate UE 102 in a MRAB MinTFC mode.

Figure 4:
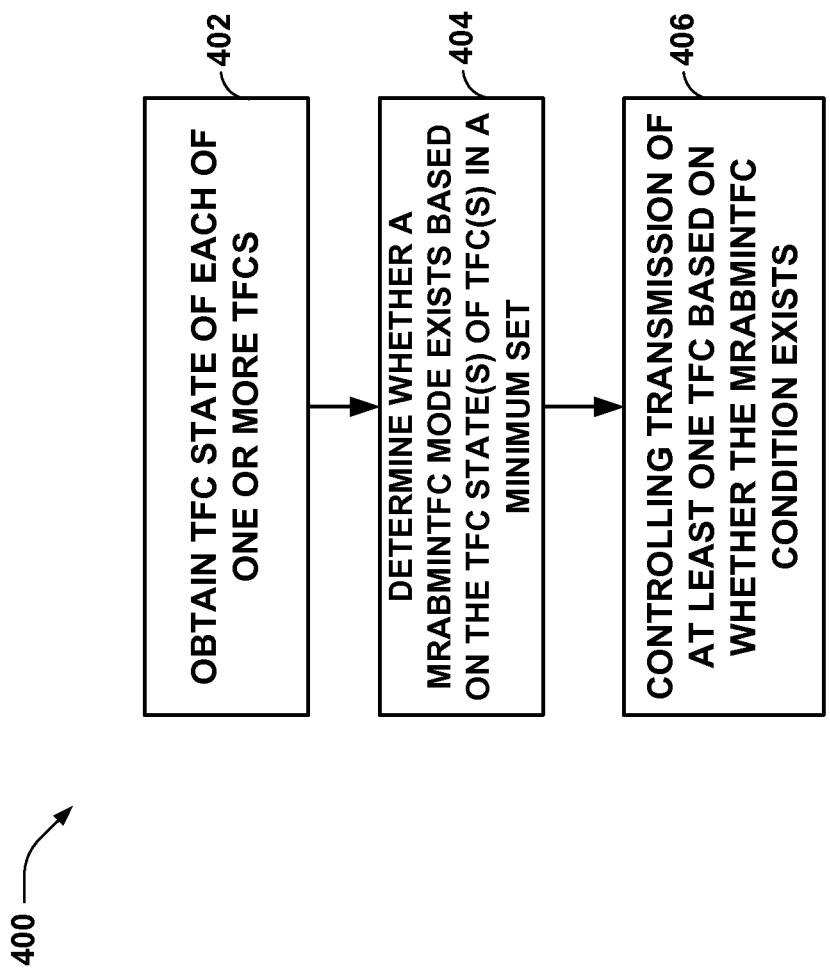
FIG. 4 is a flowchart of an example method of the UE of FIG. 1.

Turning to FIG. 4, an example method for controlling wireless communication is presented. In an aspect, a UE 102 and/or a MAC component 104 contained therein may obtain the current TFC state 120 of at least one TFC at block 402. The UE 102 and/or MAC component 104 may obtain the TFC states 120 from a PHY component 122 in UE 102. Alternatively, the MAC component 104 may obtain the TFC states 120 through its own measurement procedure. At block 404, based on the obtained TFC states 120, the UE 102 and/or MRAB MinTFC mode determining component 108 may determine whether a MRAB MinTFC condition exists for operating the UE 102 in a MRAB MinTFC mode based on at least one TFC state, for example, of the TFCs in a MinTFC set or the TFCs outside of the MinTFC set. In an aspect, MRAB MinTFC mode determining component 108 may store information related to which TFCs in the UE 102 will be included in the previously-defined MinTFC set. Therefore, at block 44, the UE 102 may determine the current TFC states of the TFCs in the MinTFC set from the current TFC states of all TFCs.

In an additional aspect of block 404, based upon the determined TFC states of the TFCs in the MinTFC set, the UE may determine a MRAB MinTFC mode based on these MinTFC set TFC states. Specifically, in an aspect, the UE may enter MRAB MinTFC mode where, all packet-switched radio bearer non-zero PDU TFCs in the MinTFC set are in an excess power or blocked state. In an aspect, a packet switched radio bearer PDU is non-zero where the PDU transmits packet-switched data. Specifically, if the TFC does not exclusively transport circuit-switched data or transmits at least some form of packet-switched data, the TFC is considered non-zero. In another aspect, at block 406, the UE may control transmission of at least one TFC based on whether the MRAB MinTFC condition exists outside of the MinTFC set at block 406. For example, in an aspect, if the UE enters MRAB MinTFC mode, PDUs outside of the MinTFC set will be filtered at block 46, such that data on these TFCs does not pass to the PHY layer and is therefore not transmitted.

Alternatively, if at least one TFC in the MinTFC set is operating in a supported state, the UE will not enter MRAB MinTFC mode. Therefore, in this instance, all TFCs will be allowed to pass data to the PHY layer without interruption.

This operation will ensure that packet-switched traffic is blocked based on the allowed power on the packet-switched non-zero PDU TFCs in the MinTFC set, which is an accurate metric for the power conditions in the UE. As such, when in MRAB MinTFC mode, though the non-MinTFC set TFCs are filtered out, those packet-switched PDUs of the MinTFC set TFCs are transmitted if sufficient power exists for this transmission. By saving power on the packet-switched communication side in this manner, a circuit-switched call can be saved in low-power conditions.

Figure 5:
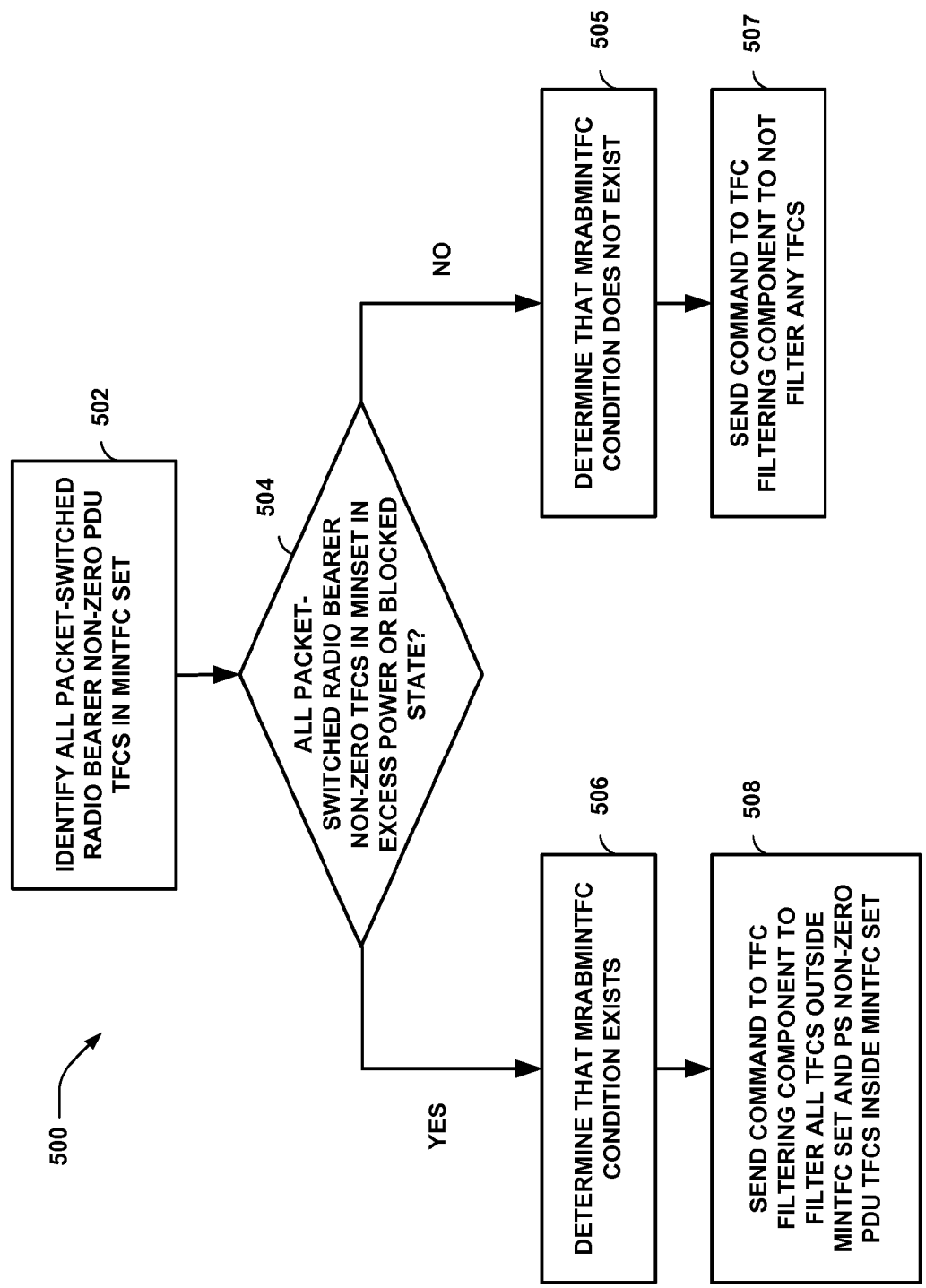
FIG. 5 is a flowchart of an example method of the UE of FIG. 1.

Turning to FIG. 5, a method for controlling transmission of one or more PDUs associated with one or more TFCs in a UE is presented. According to the example methodology 500 of FIG. 5, the UE may base the transmission control on one or more TFC states associated with one or more TFCs in a MinTFC set. In an aspect, at block 502, the UE may identify which TFCs are included in a MinTFC set. For example, in one non-limiting example of block 502, the TFCs of the MinTFC set may be packet-switched (PS) radio bearer (RB) non-zero PDU TFCs. Once those TFCs in the MinTFC set have been identified, the MinTFC set may determine if all packet-switched non-zero PDU TFCs in the MinTFC set are in an excess power state or a blocked state. If so, the UE may determine that the MRAB MinTFC condition exists at block 506, which indicates that the UE should operate in a MRAB MinTFC mode. As a consequence of operating in MRAB MinTFC mode, at block 508, the UE may send a command to a TFC controlling component of the UE (e.g. TFC controlling component 114 (FIG. 1)) to block all packet-switched non-zero PDU TFCs associated with the UE. As a result, TFC controlling component 114 may block transmission of one or more of the TFCs' PDUs—for example, those TFCs inside the MinTFC set or those TFCs outside the MinTFC set. In an aspect, these blocked TFCs may include all TFCs inside and outside of the MinTFC set. Alternatively, the blocked TFCs may only be those not included in the MinTFC set. In addition, the blocked PDUs may comprise packet-switched radio bearer non-zero PDUs. Additionally, though the TFC controlling component 114 may block all general data transmission from non-zero MinTFC set TFCs when operating in MRAB MinTFC mode, in an aspect, TFC controlling component 114 may allow transmission of one or more vital control PDUs or TFCs including signaling data associated with the TFCs in the MinTFC set when in MRAB MinTFC mode. In other words, when operating in MRAB MinTFC mode, TFC controlling component 114 may block transmission of all PS non-zero PDU TFCs inside and/or outside of the MinTFC set, but may allow transmission (or passage to the PHY layer) of TFCs containing exclusively circuit-switched, signaling, and/or control data.

In an alternative aspect, at block 504, the MRAB MinTFC mode determining component may find that not all packet-switched non-zero PDU TFCs are in an excess power or blocked state. Explained differently, the MRAB MinTFC mode determining component may find that at least one PDU TFC is in a supported state. If so, the UE may determine that the MRAB MinTFC mode does not exist at block 505, which indicates that the UE will not enter MRAB MinTFC mode and will instead operate as normal—that is, according to the TFC states of the individual TFCs. As a consequence of operating in MRAB MinTFC mode, at block 508, a component of the UE may send a command to TFC controlling component 114 (FIG. 1) to not block any TFC PDUs, such as, but not limited to PDUs of packet-switched non-zero PDU TFCs. As a result, TFC controlling component 114 may allow transmission of all the packet-switched radio bearer non-zero PDU TFCs in the MinTFC and/or those outside the MinTFC set.

Figure 6:
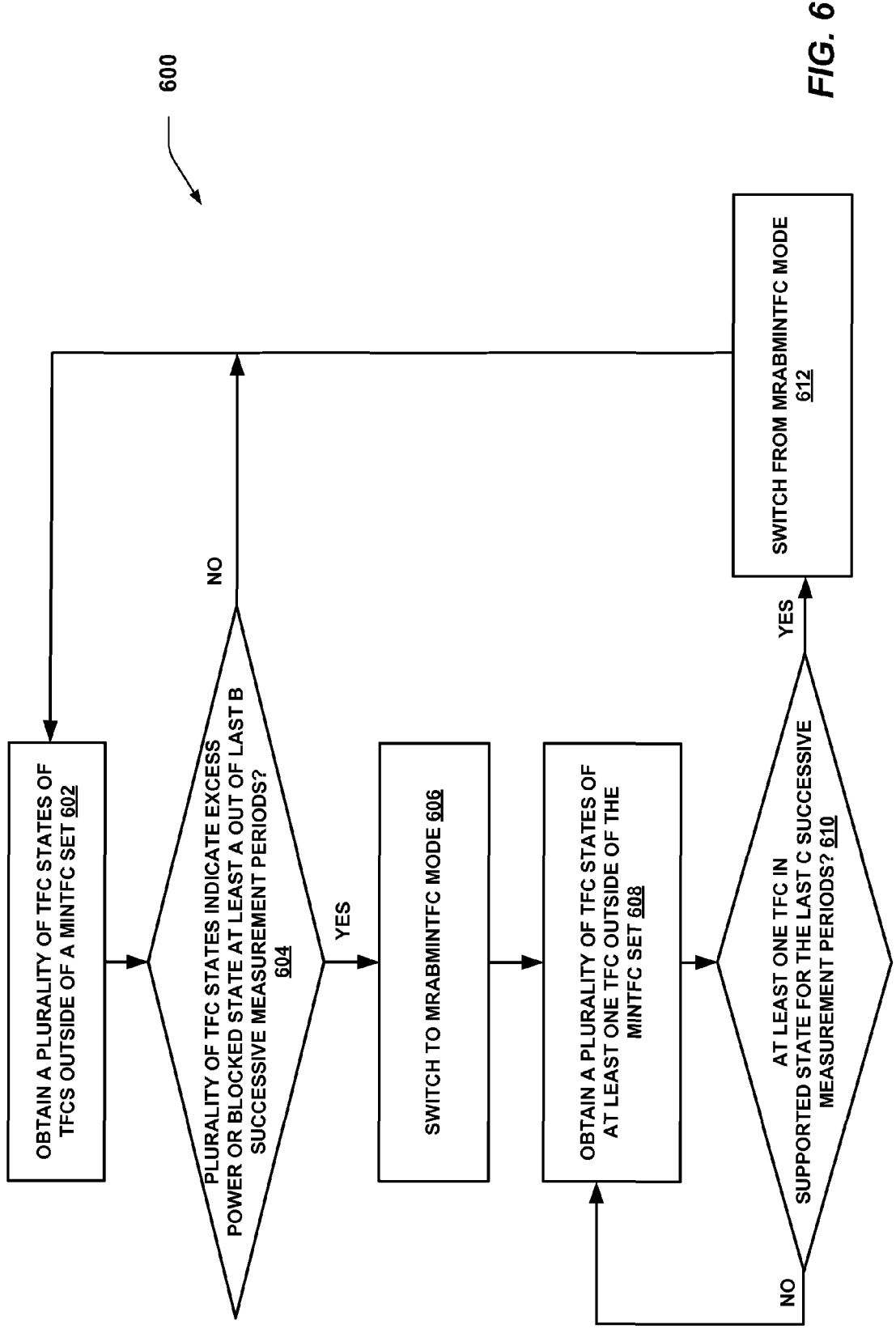
FIG. 6 is a flowchart of an example method of the UE of FIG. 1.

Referring to FIG. 6, in one aspect, illustrated is a method 600 for moving to and from a MRAB MinTFC mode. At block 602, a plurality of TFC states of TFCs outside of a MinTFC set can be obtained. For example, this can include querying at the MAC layer for previously specified TFC states, reading the TFC states from a memory location, and/or the like.

At block 604, it can be determined whether the plurality of TFC states indicate excess power or blocked state at least A out of the last B successive measurement periods. If so, at block 606, switching to the MRAB MinTFC mode can occur. If TFC states do not indicate excess power or blocked state for at least A out of the last B successive measurement periods for all TFCs, the method continues at 602 to subsequently obtain TFC states. In an example, the method can suspend before moving to step 602 according to a timer or other event. In one example, the method continues at 602 in the next measurement period.

After switching to the MRAB MinTFC mode at 606, a plurality of TFC states of at least one TFC outside of the MinTFC set can be obtained. Similarly, this obtaining can be performed based on a timer or other event following the switch to MRAB MinTFC mode, such as upon entering another measurement period.

At 610, it can be determined whether at least one TFC is in supported state for at least C successive measurement periods. If so, at 612, a switch from the MRAB MinTFC mode (e.g., to a normal or other non-MRAB MinTFC mode) can occur, and the method continues at step 602 (e.g., according to a timer or other event). If at least one TFC is not in supported state for at least C successive measurement periods, the method continues at step 608 where TFC states for at least one TFC are obtained. This can be subject to a timer or other event, such as the start of a next measurement period.

Figure 7:
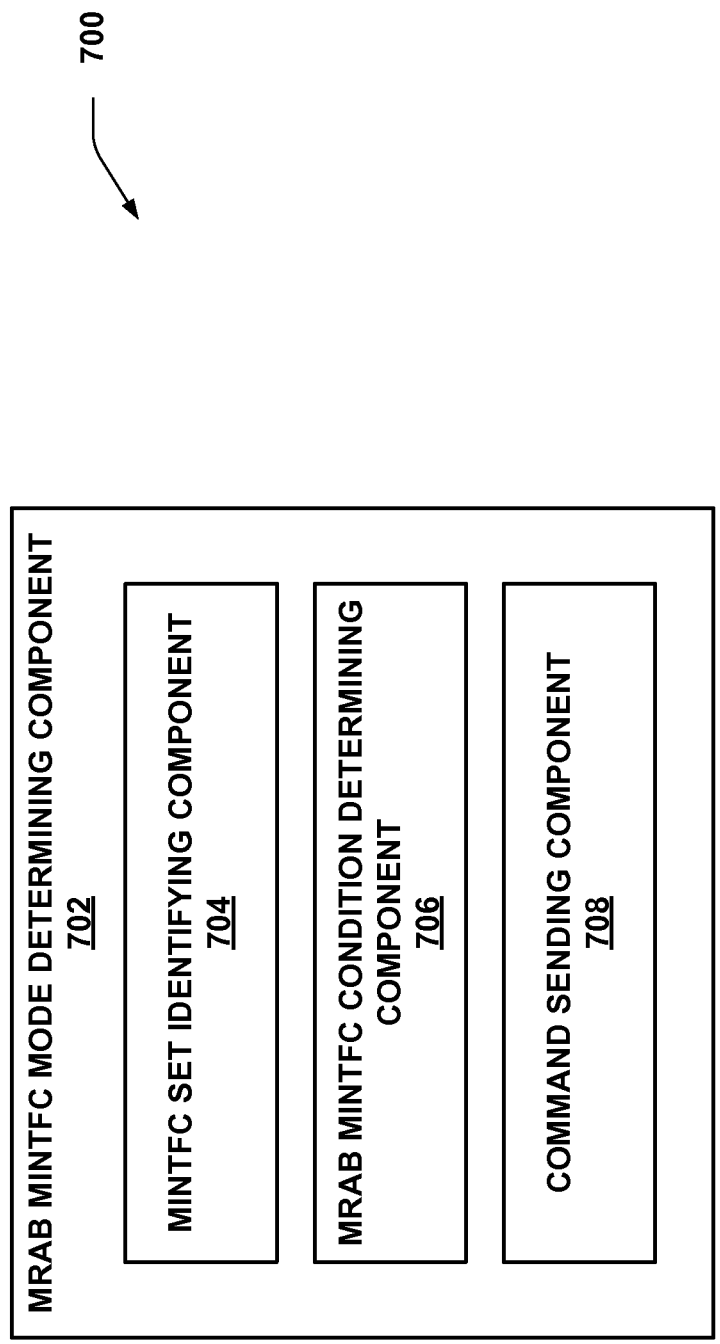
FIG. 7 is a block diagram of one aspect of components of a MRAB MinTFC mode determining component in the present disclosure.

FIG. 7 illustrates an example MRAB MinTFC mode determining component 702, which may represent MRAB MinTFC mode determining component 108 of FIG. 1, and may be configured to determine whether a UE should operate in a MRAB MinTFC mode based on one or more TFC states. In an aspect, MinTFC set identifying component 704 may be configured to identify a MinTFC set of the TFCs associated with the UE. Furthermore, MRAB MinTFC mode determining component 702 may include an MRAB MinTFC condition determining component 706, which may be configured to determine whether an MRAB MinTFC condition exists at a given time. In an additional aspect, MRAB MinTFC condition determining component 706 may be configured to determine whether the MRAB MinTFC condition exists based on the TFC state(s) of one or more TFCs associated with the UE—which may be TFCs inside or outside a MinTFC set. Furthermore, MRAB MinTFC condition determining component 706 may include a command sending component 708 configured to generate and/or transmit a command to one or more components of a UE for controlling transmission of one or more PDUs associated with at least one TFC based on whether the UE is operating in a MRAB Min TFC mode. For example, the command generated by command sending component 708 may cause the UE to allow or disallow the one or more PDUs to pass to a PHY layer.

Figure 8:
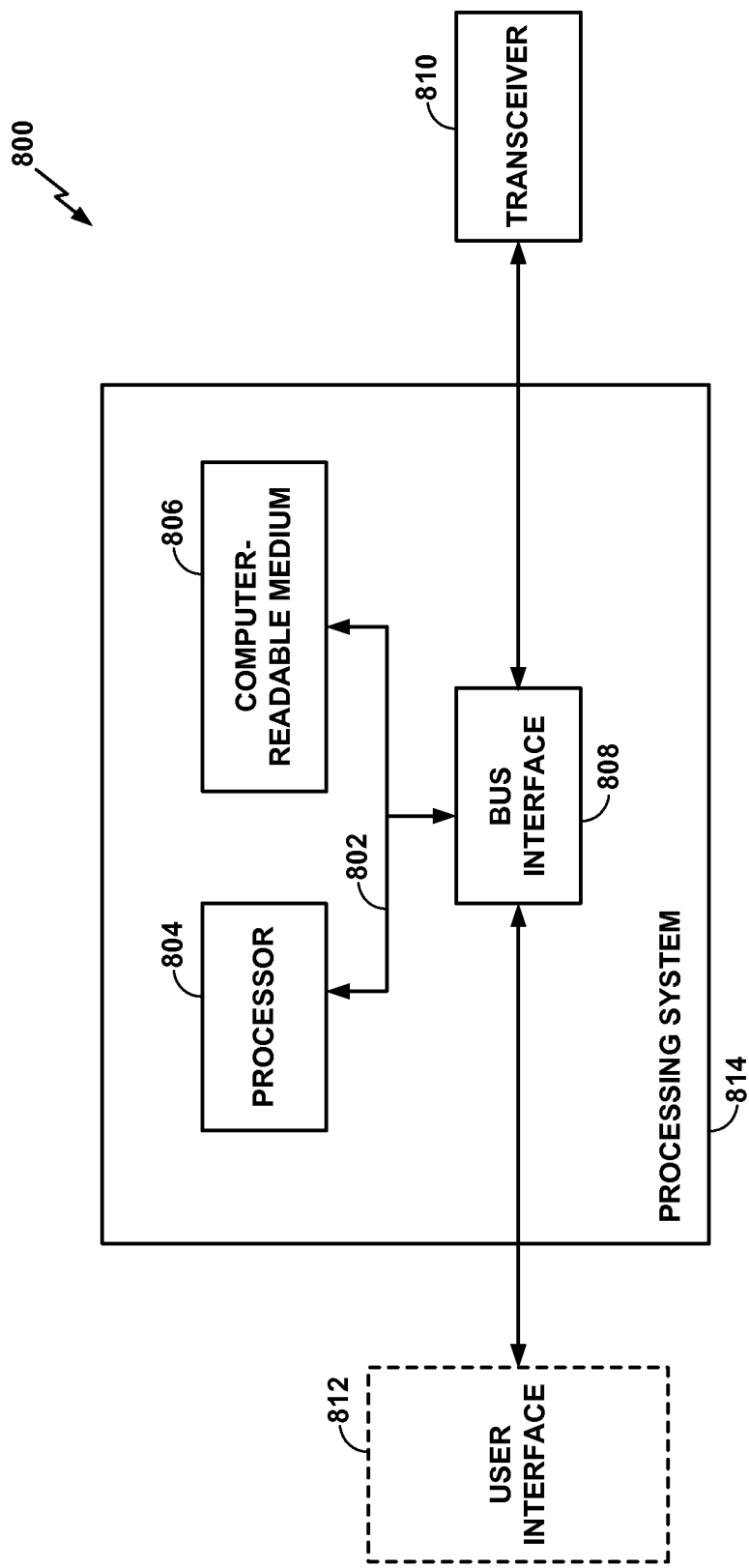
FIG. 8 is a block diagram illustrating an example of a hardware implementation for an apparatus of the present disclosure employing a processing system.

FIG. 8 is a block diagram illustrating an example of a hardware implementation for an apparatus 800 employing a processing system 814. For example, apparatus 800 may be specially programmed or otherwise configured to operate as UE 102 and/or MAC component 104, as described above. In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors, represented generally by the processor 804, and computer-readable media, represented generally by the computer-readable medium 806. The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described infra for any particular apparatus. The computer-readable medium 806 may also be used for storing data that is manipulated by the processor 804 when executing software. In an aspect, for example, processor 804 and/or computer-readable medium 806 may be specially programmed or otherwise configured to operate as UE 822 and/or MAC component 804, and/or as network component 86 and/or MAC component 88, as described above.

The various concepts presented throughout this disclosure may be implemented across a broad variety of telecommunication systems, network architectures, and communication standards.

Figure 9:
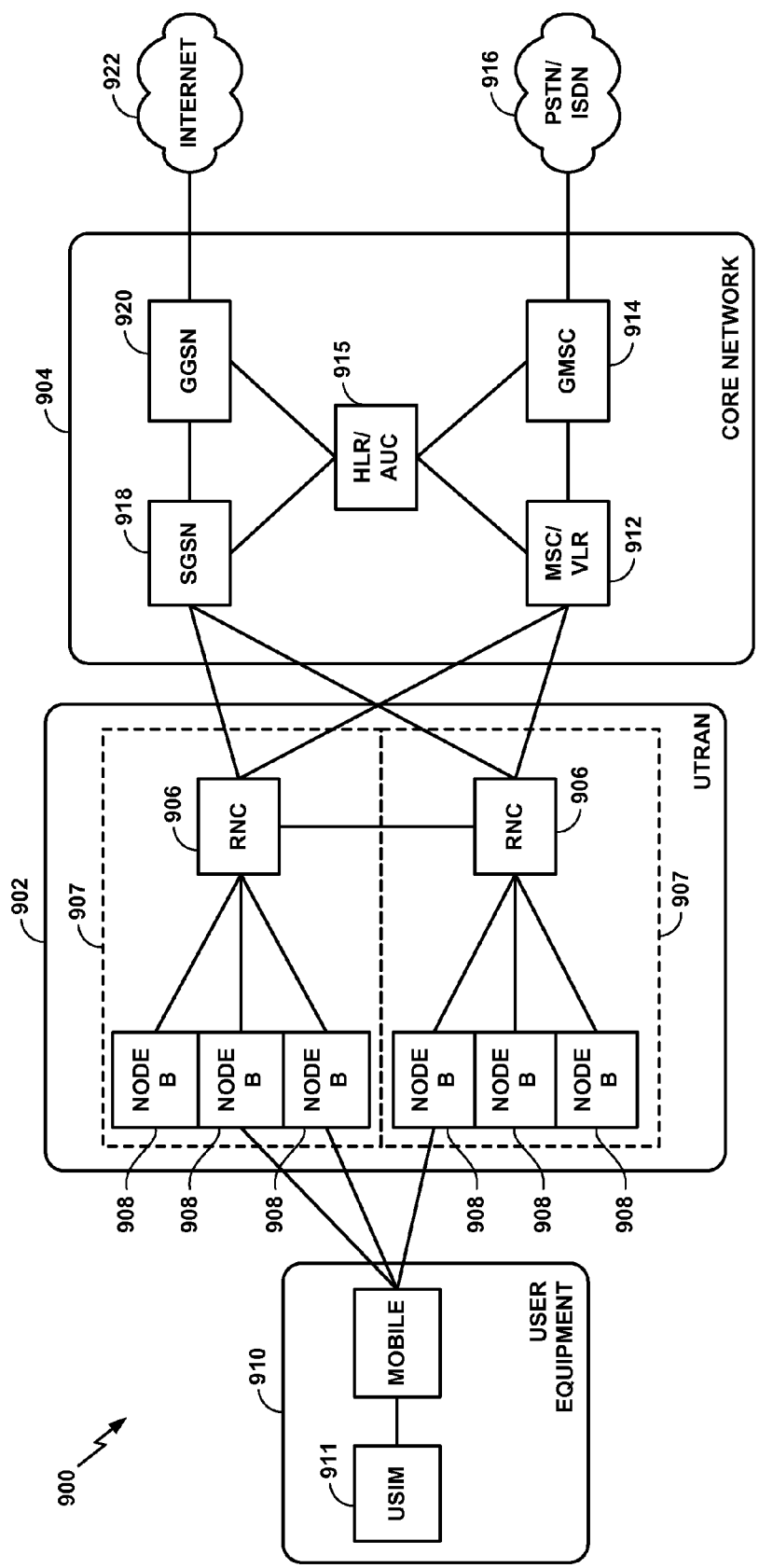
FIG. 9 is a block diagram conceptually illustrating an example of a telecommunications system including aspects of the present disclosure.

By way of example and without limitation, the aspects of the present disclosure illustrated in FIG. 9 are presented with reference to a UMTS system 900 employing a W-CDMA air interface. A UMTS network includes three interacting domains: a Core Network (CN) 904, a UMTS Terrestrial Radio Access Network (UTRAN) 902, and User Equipment (UE) 910. In this example, the UTRAN 902 provides various wireless services including telephony, video, data, messaging, broadcasts, and/or other services. The UTRAN 902 may include a plurality of Radio Network Subsystems (RNSs) such as an RNS 907, each controlled by a respective Radio Network Controller (RNC) such as an RNC 906. Here, the UTRAN 902 may include any number of RNCs 906 and RNSs 907 in addition to the RNCs 906 and RNSs 907 illustrated herein. The RNC 906 is an apparatus responsible for, among other things, assigning, reconfiguring and releasing radio resources within the RNS 907. The RNC 906 may be interconnected to other RNCs (not shown) in the UTRAN 902 through various types of interfaces such as a direct physical connection, a virtual network, or the like, using any suitable transport network.

Communication between a UE 910 and a Node B 908 may be considered as including a physical (PHY) layer and a medium access control (MAC) layer. Further, communication between a UE 910 and an RNC 906 by way of a respective Node B 908 may be considered as including a radio resource control (RRC) layer. In the instant specification, the PHY layer may be considered layer 1; the MAC layer may be considered layer 9; and the RRC layer may be considered layer 3. Information hereinbelow utilizes terminology introduced in the RRC Protocol Specification, 3GPP TS 95.331 v9.1.0, incorporated herein by reference. Further, for example, UE 910 and Node Bs 908 and/or RNCs 906 respectively may be specially programmed or otherwise configured to operate as UE 102 and/or MAC component 104, as described above with reference to FIG. 1.

The geographic region covered by the RNS 907 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 908 are shown in each RNS 907; however, the RNSs 907 may include any number of wireless Node Bs. The Node Bs 908 provide wireless access points to a CN 904 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 910 may further include a universal subscriber identity module (USIM) 911, which contains a user's subscription information to a network. For illustrative purposes, one UE 910 is shown in communication with a number of the Node Bs 908. The DL, also called the forward link, refers to the communication link from a Node B 908 to a UE 910, and the UL, also called the reverse link, refers to the communication link from a UE 910 to a Node B 908.

The CN 904 interfaces with one or more access networks, such as the UTRAN 902. As shown, the CN 904 is a GSM core network. However, as those skilled in the art will recognize, the various concepts presented throughout this disclosure may be implemented in a RAN, or other suitable access network, to provide UEs with access to types of CNs other than GSM networks.

The CN 904 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 904 supports circuit-switched services with a MSC 912 and a GMSC 914. In some applications, the GMSC 914 may be referred to as a media gateway (MGW). One or more RNCs, such as the RNC 906, may be connected to the MSC 912. The MSC 912 is an apparatus that controls call setup, call routing, and UE mobility functions. The MSC 912 also includes a VLR that contains subscriber-related information for the duration that a UE is in the coverage area of the MSC 912. The GMSC 914 provides a gateway through the MSC 912 for the UE to access a circuit-switched network 916. The GMSC 914 includes a home location register (HLR) 915 containing subscriber data, such as the data reflecting the details of the services to which a particular user has subscribed. The HLR is also associated with an authentication center (AuC) that contains subscriber-specific authentication data. When a call is received for a particular UE, the GMSC 914 queries the HLR 915 to determine the UE's location and forwards the call to the particular MSC serving that location.

The CN 904 also supports packet-data services with a serving GPRS support node (SGSN) 918 and a gateway GPRS support node (GGSN) 920. GPRS, which stands for General Packet Radio Service, is designed to provide packet-data services at speeds higher than those available with standard circuit-switched data services. The GGSN 920 provides a connection for the UTRAN 902 to a packet-based network 922. The packet-based network 922 may be the Internet, a private data network, or some other suitable packet-based network. The primary function of the GGSN 920 is to provide the UEs 910 with packet-based network connectivity. Data packets may be transferred between the GGSN 920 and the UEs 910 through the SGSN 918, which performs primarily the same functions in the packet-based domain as the MSC 912 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 908 and a UE 910. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 910 provides feedback to the node B 908 over the HS-DPCCH to indicate whether it correctly decoded a packet on the downlink.

HS-DPCCH further includes feedback signaling from the UE 910 to assist the node B 908 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance That is, in an aspect of the disclosure, the node B 908 and/or the UE 910 may have multiple antennas supporting MIMO technology. The use of MIMO technology enables the node B 908 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 910 to increase the data rate or to multiple UEs 910 to increase the overall system capacity. This is achieved by spatially precoding each data stream and then transmitting each spatially precoded stream through a different transmit antenna on the downlink. The spatially precoded data streams arrive at the UE(s) 910 with different spatial signatures, which enables each of the UE(s) 910 to recover the one or more the data streams destined for that UE 910. On the uplink, each UE 910 may transmit one or more spatially precoded data streams, which enables the node B 908 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 10:
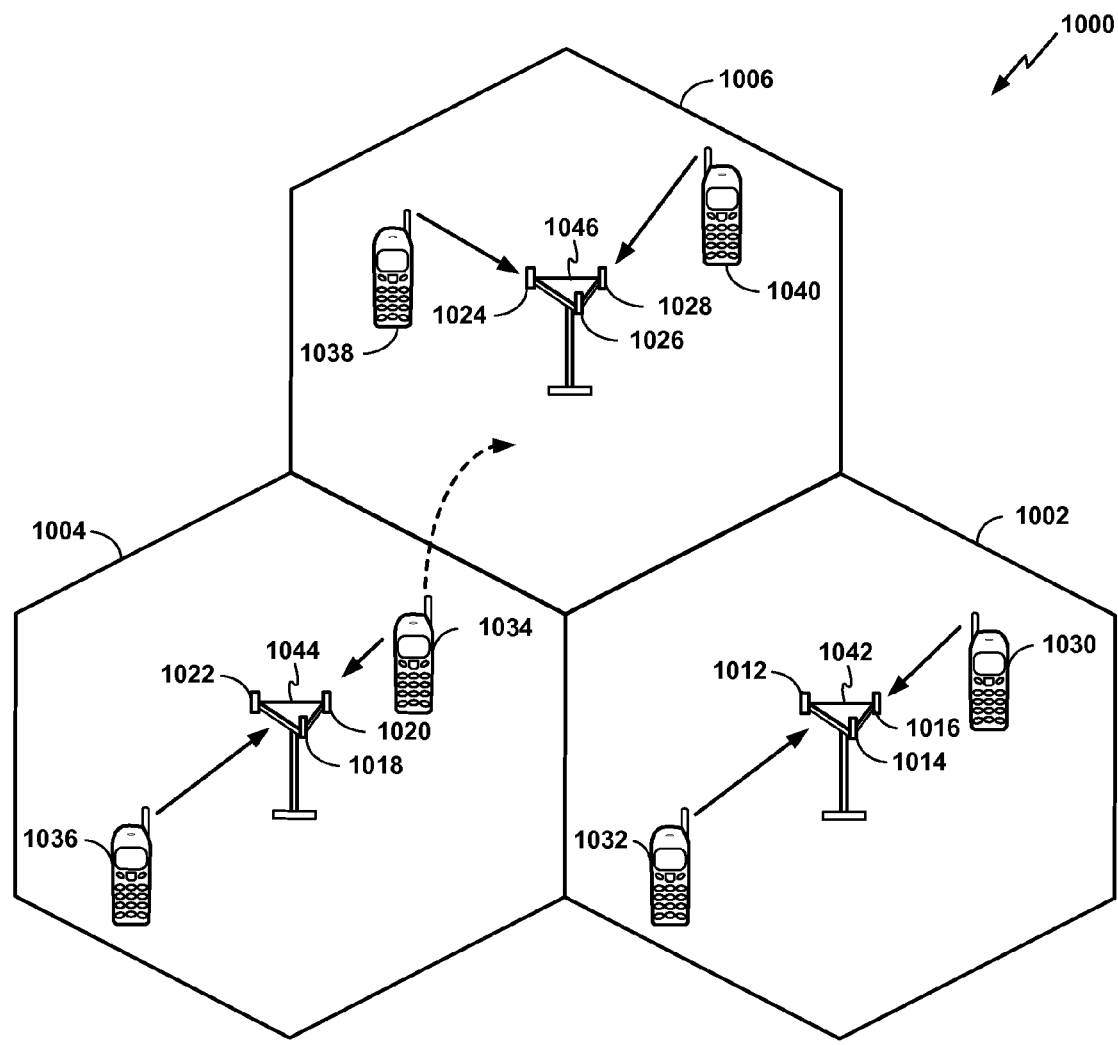
FIG. 10 is a conceptual diagram illustrating an example of an access network including aspects of the present disclosure.

Referring to FIG. 10, an access network 1000 in a UTRAN architecture is illustrated. The multiple access wireless communication system includes multiple cellular regions (cells), including cells 1002, 1004, and 1006, each of which may include one or more sectors. The multiple sectors can be formed by groups of antennas with each antenna responsible for communication with UEs in a portion of the cell. For example, in cell 1002, antenna groups 1012, 1014, and 1016 may each correspond to a different sector. In cell 1004, antenna groups 1018, 1020, and 1022 each correspond to a different sector. In cell 1006, antenna groups 1024, 1026, and 1028 each correspond to a different sector. The cells 1002, 1004 and 1006 may include several wireless communication devices, e.g., User Equipment or UEs, which may be in communication with one or more sectors of each cell 1002, 1004 or 1006. For example, UEs 1030 and 1032 may be in communication with Node B 1042, UEs 1034 and 1036 may be in communication with Node B 1044, and UEs 1038 and 1040 can be in communication with Node B 1046. Here, each Node B 1042, 1044, 1046 is configured to provide an access point to a CN 204 (see FIG. 8) for all the UEs 1030, 1032, 1034, 1036, 1038, 1040 in the respective cells 1002, 1004, and 1006. For example, in an aspect, the UEs and Node Bs of FIG. 9 may be specially programmed or otherwise configured to operate as UE 122 and/or MAC component 104, and/or as network component 16 and/or MAC component 18, as described above.

As the UE 1034 moves from the illustrated location in cell 1004 into cell 1006, a serving cell change (SCC) or handover may occur in which communication with the UE 1034 transitions from the cell 1004, which may be referred to as the source cell, to cell 1006, which may be referred to as the target cell. Management of the handover procedure may take place at the UE 1034, at the Node Bs corresponding to the respective cells, at a radio network controller 206 (see FIG. 8), or at another suitable node in the wireless network. For example, during a call with the source cell 1004, or at any other time, the UE 1034 may monitor various parameters of the source cell 1004 as well as various parameters of neighboring cells such as cells 1006 and 1002. Further, depending on the quality of these parameters, the UE 1034 may maintain communication with one or more of the neighboring cells. During this time, the UE 1034 may maintain an Active Set, that is, a list of cells that the UE 1034 is simultaneously connected to (i.e., the UTRA cells that are currently assigning a downlink dedicated physical channel DPCH or fractional downlink dedicated physical channel F-DPCH to the UE 1034 may constitute the Active Set).

The modulation and multiple access scheme employed by the access network 1000 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 11:
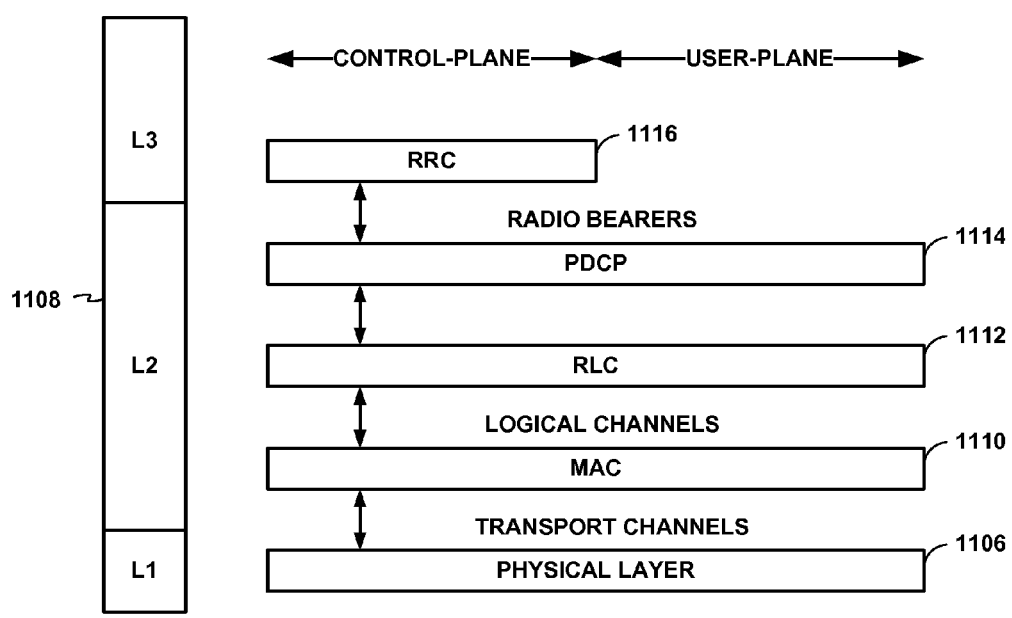
FIG. 11 is a conceptual diagram illustrating an example of a radio protocol architecture for the user and control plane implemented by components of the present disclosure.

The radio protocol architecture may take on various forms depending on the particular application. An example for an HSPA system will now be presented with reference to FIG. 11. FIG. 11 is a conceptual diagram illustrating an example of the radio protocol architecture for the user and control planes.

Referring to FIG. 11, the radio protocol architecture for the UE and Node B is shown with three layers: Layer 1, Layer 2, and Layer 3. Layer 1 is the lowest lower and implements various physical layer signal processing functions. Layer 1 will be referred to herein as the physical layer 1106. Layer 2 (L2 layer) 1108 is above the physical layer 1106 and is responsible for the link between the UE and Node B over the physical layer 1106. For example, the UE and Node B corresponding to the radio protocol architecture of FIG. 10 may be specially programmed or otherwise configured to operate as UE 102 and/or MAC component 104, and/or as network component 16 and/or MAC component 18, as described above.

In the user plane, the L2 layer 1108 includes a media access control (MAC) sublayer 1110, a radio link control (RLC) sublayer 1112, and a packet data convergence protocol (PDCP) 1114 sublayer, which are terminated at the node B on the network side. Although not shown, the UE may have several upper layers above the L2 layer 1108 including a network layer (e.g., IP layer) that is terminated at a PDN gateway on the network side, and an application layer that is terminated at the other end of the connection (e.g., far end UE, server, etc.).

The PDCP sublayer 1114 provides multiplexing between different radio bearers and logical channels. The PDCP sublayer 1114 also provides header compression for upper layer data packets to reduce radio transmission overhead, security by ciphering the data packets, and handover support for UEs between node Bs. The RLC sublayer 1112 provides segmentation and reassembly of upper layer data packets, retransmission of lost data packets, and reordering of data packets to compensate for out-of-order reception due to hybrid automatic repeat request (HARQ). The MAC sublayer 1110 provides multiplexing between logical and transport channels. The MAC sublayer 1110 is also responsible for allocating the various radio resources (e.g., resource blocks) in one cell among the UEs. The MAC sublayer 1110 is also responsible for HARQ operations.

Figure 12:
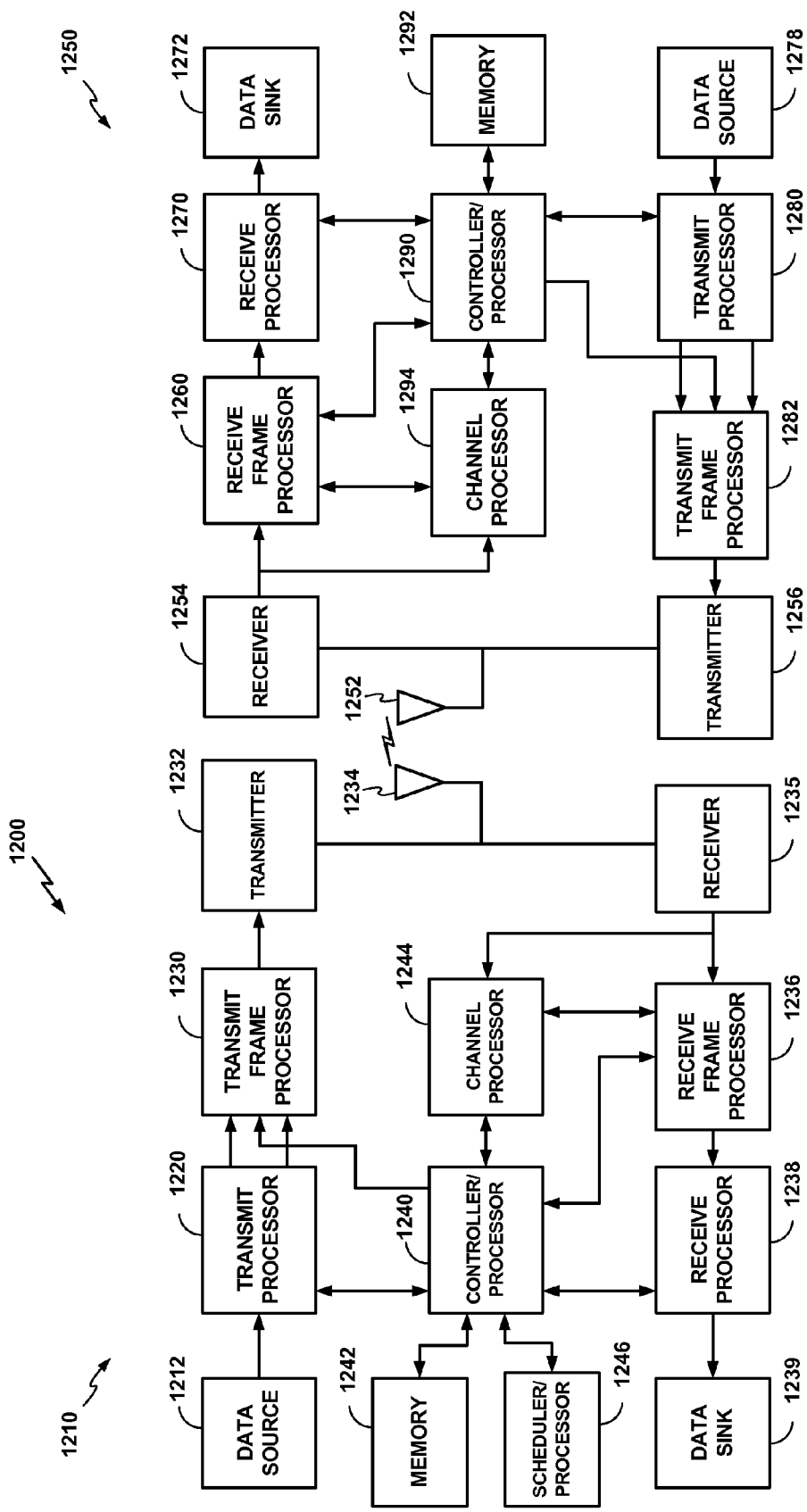
FIG. 12 is a block diagram conceptually illustrating an example of a Node B in communication with a UE in a telecommunications system, including aspects of the present disclosure.

FIG. 12 is a block diagram of a Node B 1210 in communication with a UE 1250. For example, UE 1250 and Node B 1210 respectively may be specially programmed or otherwise configured to operate as UE 102 and/or MAC component 104, as described above. Further, for example, the Node B 1210 may be the Node B 208 in FIG. 8, and the UE 1250 may be the UE 210 in FIG. 8. In the downlink communication, a transmit processor 1220 may receive data from a data source 1212 and control signals from a controller/processor 1240. The transmit processor 1220 provides various signal processing functions for the data and control signals, as well as reference signals (e.g., pilot signals). For example, the transmit processor 1220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1244 may be used by a controller/processor 1240 to determine the coding, modulation, spreading, and/or scrambling schemes for the transmit processor 1220. These channel estimates may be derived from a reference signal transmitted by the UE 1250 or from feedback from the UE 1250. The symbols generated by the transmit processor 1220 are provided to a transmit frame processor 1230 to create a frame structure. The transmit frame processor 1230 creates this frame structure by multiplexing the symbols with information from the controller/processor 1240, resulting in a series of frames. The frames are then provided to a transmitter 1232, which provides various signal conditioning functions including amplifying, filtering, and modulating the frames onto a carrier for downlink transmission over the wireless medium through antenna 1234. The antenna 1234 may include one or more antennas, for example, including beam steering bidirectional adaptive antenna arrays or other similar beam technologies.

At the UE 1250, a receiver 1254 receives the downlink transmission through an antenna 1252 and processes the transmission to recover the information modulated onto the carrier. The information recovered by the receiver 1254 is provided to a receive frame processor 1260, which parses each frame, and provides information from the frames to a channel processor 1294 and the data, control, and reference signals to a receive processor 1270. The receive processor 1270 then performs the inverse of the processing performed by the transmit processor 1220 in the Node B 1210. More specifically, the receive processor 1270 descrambles and despreads the symbols, and then determines the most likely signal constellation points transmitted by the Node B 1210 based on the modulation scheme. These soft decisions may be based on channel estimates computed by the channel processor 1294. The soft decisions are then decoded and deinterleaved to recover the data, control, and reference signals. The CRC codes are then checked to determine whether the frames were successfully decoded. The data carried by the successfully decoded frames will then be provided to a data sink 1272, which represents applications running in the UE 1250 and/or various user interfaces (e.g., display). Control signals carried by successfully decoded frames will be provided to a controller/processor 1290. When frames are unsuccessfully decoded by the receiver processor 1270, the controller/processor 1290 may also use an acknowledgement (ACK) and/or negative acknowledgement (NACK) protocol to support retransmission requests for those frames.

In the uplink, data from a data source 1278 and control signals from the controller/processor 1290 are provided to a transmit processor 1280. The data source 1278 may represent applications running in the UE 1250 and various user interfaces (e.g., keyboard). Similar to the functionality described in connection with the downlink transmission by the Node B 1210, the transmit processor 1280 provides various signal processing functions including CRC codes, coding and interleaving to facilitate FEC, mapping to signal constellations, spreading with OVSFs, and scrambling to produce a series of symbols. Channel estimates, derived by the channel processor 1294 from a reference signal transmitted by the Node B 1210 or from feedback contained in the midamble transmitted by the Node B 1210, may be used to select the appropriate coding, modulation, spreading, and/or scrambling schemes. The symbols produced by the transmit processor 1280 will be provided to a transmit frame processor 1282 to create a frame structure. The transmit frame processor 1282 creates this frame structure by multiplexing the symbols with information from the controller/processor 1290, resulting in a series of frames. The frames are then provided to a transmitter 1256, which provides various signal conditioning functions including amplification, filtering, and modulating the frames onto a carrier for uplink transmission over the wireless medium through the antenna 1252.

The uplink transmission is processed at the Node B 1210 in a manner similar to that described in connection with the receiver function at the UE 1250. A receiver 1235 receives the uplink transmission through the antenna 1234 and processes the transmission to recover the information modulated onto the carrier. The information recovered by the receiver 1235 is provided to a receive frame processor 1236, which parses each frame, and provides information from the frames to the channel processor 1244 and the data, control, and reference signals to a receive processor 1238. The receive processor 1238 performs the inverse of the processing performed by the transmit processor 1280 in the UE 1250. The data and control signals carried by the successfully decoded frames may then be provided to a data sink 1239 and the controller/processor, respectively. If some of the frames were unsuccessfully decoded by the receive processor, the controller/processor 1240 may also use an acknowledgement (ACK) and/or negative acknowledgement (NACK) protocol to support retransmission requests for those frames.

The controller/processors 1240 and 1290 may be used to direct the operation at the Node B 1210 and the UE 1250, respectively. For example, the controller/processors 1240 and 1290 may provide various functions including timing, peripheral interfaces, voltage regulation, power management, and other control functions. The computer readable media of memories 1242 and 1292 may store data and software for the Node B 1210 and the UE 1250, respectively. A scheduler/processor 1246 at the Node B 1210 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Further, unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
    obtaining a transport format combination (TFC) state of each of one or more TFCs associated with a user equipment, wherein the one or more TFCs include a minimum TFC (MinTFC) set having at least one TFC, and wherein the TFC state of each of the one or more TFCs includes one of an excess power state, a blocked state, or a supported state;
    determining whether a multiple radio access bearer (MRAB) MinTFC condition exists for operating a user equipment in a MRAB MinTFC mode, wherein determining whether the MRAB MinTFC condition exists further includes:
        identifying all packet-switched (PS) radio bearer (RB) non-zero protocol data unit (PDU) TFCs in the MinTFC set;
        determining that the MRAB MinTFC condition exists when all of the PS RB non-zero PDU TFCs in the MinTFC set are in the excess power state or the blocked state; and
        determining that the MRAB MinTFC condition does not exist when one of the PS RB non-zero PDU TFCs in the MinTFC set is in the supported state; and
    controlling, in the MRAB MinTFC mode, transmission associated with the at least one TFC of the MinTFC set based on determining that the MRAB MinTFC condition exists.

2. The method of claim 1, wherein controlling transmission associated with the at least one TFC further comprises allowing of at least one circuit-switched (CS) RB non-zero PDU TFC of at least one TFC in the MinTFC set pass to a physical layer when the MRAB MinTFC condition is determined to exist.

3. The method of claim 2, wherein controlling transmission associated with the at least one TFC further comprises blocking passage of all PDUs of TFCs outside of the MinTFC set to the physical layer.

4. The method of claim 1, wherein controlling transmission associated with the at least one TFC further comprises allowing passage of all of the packet-switched (PS) radio bearer (RB) non-zero PDU TFCs in the MinTFC set to the physical layer according to a corresponding TFC state when the MRAB MinTFC condition is determined not to exist.

5. The method of claim 4, wherein controlling transmission associated with the at least one TFC further comprises allowing all TFCs outside of the MinTFC set to pass to the physical layer.

6. The method of claim 1, wherein controlling transmission associated with the at least one TFC further comprises at least one of blocking data related to the at least one TFC outside of the MinTFC set from passing to a physical layer when the determining comprises determining to operate the UE in the MRAB MinTFC mode, or allowing data related to the at least one TFC outside of the MinTFC set to pass to the physical layer when the determining comprises determining not to operate the UE in the MRAB MinTFC mode.

7. The method of claim 1, wherein obtaining comprises obtaining a plurality of TFC states for each of substantially all TFCs outside of the MinTFC set.

8. The method of claim 7, wherein determining comprises determining to operate the UE in the MRAB MinTFC mode where the at least a portion of the plurality of TFC states for each of the substantially all TFCs indicate an excess power or blocked state.

9. The method of claim 8, wherein the portion is computed based in part on a specified number, A, of TFC states over a number, B, of the plurality of TFC states.

10. The method of claim 1, wherein the UE is in the MRAB MinTFC mode, and wherein determining comprises determining to not operate the UE in the MRAB MinTFC mode where a number, C, of the plurality of TFC states corresponding to successive measurement periods of the at least one TFC indicate a supported state.

11. The method of claim 10, further comprising ceasing the controlling transmission associated with the at least one TFC based on determining to not operate the UE in the MRAB MinTFC mode.

12. The method of claim 1, wherein obtaining comprises obtaining a plurality of TFC states of the at least one TFC over a plurality of prior successive measurement periods.

13. An apparatus for wireless communication, comprising:
  means for obtaining a transport format combination (TFC) state of each of one or more TFCs associated with a user equipment, wherein the one or more TFCs include a minimum TFC (MinTFC) set having at least one TFC, and wherein the TFC state of each of the one or more TFCs includes one of an excess power state, a blocked state, or a supported state;
  means for determining whether a multiple radio access bearer (MRAB) MinTFC condition exists for operating a user equipment in a MRAB MinTFC mode, wherein the means for determining whether the MRAB MinTFC condition exists further includes:
    means for identifying all packet-switched (PS) radio bearer (RB) non-zero protocol data unit (PDU) TFCs in the MinTFC set;
    means for determining that the MRAB MinTFC condition exists when all of the PS RB non-zero PDU TFCs in the MinTFC set are in the excess power state or the blocked state; and
    means for determining that the MRAB MinTFC condition does not exist when one of the PS RB non-zero PDU TFCs in the MinTFC set is in the supported state; and
  means for controlling, in the MRAB MinTFC mode, transmission associated with the at least one TFC of the MinTFC set based on determining that the MRAB MinTFC condition exists.

14. The apparatus of claim 13, wherein the means for controlling transmission associated with the at least one TFC further comprises means for allowing of at least one circuit-switched (CS) RB non-zero PDU TFC of at least one TFC in the MinTFC set pass to a physical layer when the MRAB MinTFC condition is determined to exist.

15. The apparatus of claim 14, wherein the means for controlling transmission associated with the at least one TFC further comprises means for blocking passage of all PDUs of TFCs outside of the MinTFC set to the physical layer.

16. The apparatus of claim 13, wherein the means for controlling transmission associated with the at least one TFC further comprises means for allowing passage of all of the packet-switched (PS) radio bearer (RB) non-zero PDU TFCs in the MinTFC set to the physical layer according to a corresponding TFC state when the MRAB MinTFC condition is determined not to exist.

17. The apparatus of claim 16, wherein the means for controlling transmission associated with the at least one TFC further comprises means for allowing all TFCs outside of the MinTFC set to pass to the physical layer.

18. The apparatus of claim 13, wherein the means for controlling transmission associated with the at least one TFC further comprises at least one of means for blocking data related to the at least one TFC outside of the MinTFC set from passing to a physical layer when the means for determining determines to operate the UE in the MRAB MinTFC mode, or means for allowing data related to the at least one TFC outside of the MinTFC set to pass to the physical layer when the means for determining determines not to operate the UE in the MRAB MinTFC mode.

19. The apparatus of claim 13, wherein the means for obtaining comprises means for obtaining a plurality of TFC states for each of substantially all TFCs outside of the MinTFC set.

20. The apparatus of claim 19, wherein the means for determining comprises means for determining to operate the UE in the MRAB MinTFC mode where the at least a portion of the plurality of TFC states for each of the substantially all TFCs indicate an excess power or blocked state.

21. The apparatus of claim 20, wherein the portion is computed based in part on a specified number, A, of TFC states over a number, B, of the plurality of TFC states.

22. The apparatus of claim 13, wherein the UE is in the MRAB MinTFC mode, and wherein the means for determining comprises means for determining to not operate the UE in the MRAB MinTFC mode where a number, C, of the plurality of TFC states corresponding to successive measurement periods of the at least one TFC indicate a supported state.

23. The apparatus of claim 22, further comprising means for ceasing the controlling transmission associated with the at least one TFC based on determining to not operate the UE in the MRAB MinTFC mode.

24. The apparatus of claim 13, wherein the means for obtaining comprises means for obtaining a plurality of TFC states of the at least one TFC over a plurality of prior successive measurement periods.

25. A computer-readable medium comprising stored code for:
  obtaining a transport format combination (TFC) state of each of one or more TFCs associated with a user equipment, wherein the one or more TFCs include a minimum TFC (MinTFC) set having at least one TFC, and wherein the TFC state of each of the one or more TFCs includes one of an excess power state, a blocked state, or a supported state;
  determining whether a multiple radio access bearer (MRAB) MinTFC condition exists for operating a user equipment in a MRAB MinTFC mode, wherein determining whether the MRAB MinTFC condition exists further includes:
    identifying all packet-switched (PS) radio bearer (RB) non-zero protocol data unit (PDU) TFCs in the MinTFC set;
    determining that the MRAB MinTFC condition exists when all of the PS RB non-zero PDU TFCs in the MinTFC set are in the excess power state or the blocked state; and
    determining that the MRAB MinTFC condition does not exist when one of the PS RB non-zero PDU TFCs in the MinTFC set is in the supported state; and
  controlling, in the MRAB MinTFC mode, transmission associated with the at least one TFC of the MinTFC set based on determining that the MRAB MinTFC condition exists.

26. The computer-readable medium of claim 25, wherein the code for controlling transmission associated with the at least one TFC further comprises code for allowing of at least one circuit-switched (CS) RB non-zero PDU TFC of at least one TFC in the MinTFC set pass to a physical layer when the MRAB MinTFC condition is determined to exist.

27. The computer-readable medium of claim 26, wherein the code for controlling transmission associated with the at least one TFC further comprises code for blocking passage of all PDUs of TFCs outside of the MinTFC set to the physical layer.

28. The computer-readable medium of claim 25, wherein the code for controlling transmission associated with the at least one TFC further comprises code for allowing passage of all of the packet-switched (PS) radio bearer (RB) non-zero PDU TFCs in the MinTFC set to the physical layer according to a corresponding TFC state when the MRAB MinTFC condition is determined not to exist.

29. The computer-readable medium of claim 28, wherein the code for controlling transmission associated with the at least one TFC further comprises code for allowing all TFCs outside of the MinTFC set to pass to the physical layer.

30. The computer-readable medium of claim 25, wherein the code for controlling transmission associated with the at least one TFC comprises at least one of code for blocking data related to the at least one TFC outside of the MinTFC set from passing to a physical layer when the executed code for determining results in determining to operate the UE in the MRAB MinTFC mode, or code for allowing data related to the at least one TFC outside of the MinTFC set to pass to the physical layer when the executed code for determining results in determining not to operate the UE in the MRAB MinTFC mode.

31. The computer-readable medium of claim 25, wherein the code for obtaining comprises code for obtaining a plurality of TFC states for each of substantially all TFCs outside of the MinTFC set.

32. The computer-readable medium of claim 31, wherein the code for determining comprises code for determining to operate the UE in the MRAB MinTFC mode where the at least a portion of the plurality of TFC states for each of the substantially all TFCs indicate an excess power or blocked state.

33. The computer-readable medium of claim 32, wherein the portion is computed based in part on a specified number, A, of TFC states over a number, B, of the plurality of TFC states.

34. The computer-readable medium of claim 25, wherein the UE is in the MRAB MinTFC mode, and wherein the code for determining comprises code for determining to not operate the UE in the MRAB MinTFC mode where a number, C, of the plurality of TFC states corresponding to successive measurement periods of the at least one TFC indicate a supported state.

35. The computer-readable medium of claim 34, further comprising code for ceasing the controlling transmission associated with the at least one TFC based on determining to not operate the UE in the MRAB MinTFC mode.

36. The computer-readable medium of claim 25, wherein the code for obtaining comprises code for obtaining a plurality of TFC states of the at least one TFC over a plurality of prior successive measurement periods.

37. An apparatus for wireless communication, comprising:
    a transport format combination (TFC) obtaining component configured to obtain a TFC state of each of one or more TFCs associated with a user equipment, wherein the one or more TFCs include a minimum TFC (MinTFC) set having at least one TFC, and wherein the TFC state of each of the one or more TFCs includes one of an excess power state, a blocked state, or a supported state;
    an multiple radio access bearer (MRAB) MinTFC mode determining component configured to determine whether a multiple radio access bearer (MRAB) MinTFC condition exists for operating a user equipment in a MRAB MinTFC mode, wherein the MRAB MinTFC mode determining component further comprises one or more components configured to:
        identify all packet-switched (PS) radio bearer (RB) non-zero protocol data unit (PDU) TFCs in the MinTFC set;
        determine that the MRAB MinTFC condition exists when all of the PS RB non-zero PDU TFCs in the MinTFC set are in the excess power state or the blocked state; and
        determine that the MRAB MinTFC condition does not exist when one of the PS RB non-zero PDU TFCs in the MinTFC set is in the supported state; and
    a TFC controlling component configured to control, in the MRAB MinTFC mode, transmission associated with the at least one TFC of the MinTFC set based on determining that the MRAB MinTFC condition exists.

38. The apparatus of claim 37, wherein the TFC controlling component further comprises at least one component configured to allow at least one circuit-switched (CS) RB non-zero PDU TFC of at least one TFC in the MinTFC set pass to a physical layer when the MRAB MinTFC condition is determined to exist.

39. The apparatus of claim 38, wherein the TFC controlling component further comprises at least one component configured to block passage of all PDUs of TFCs outside of the MinTFC set to the physical layer.

40. The apparatus of claim 37, wherein the TFC controlling component further comprises at least one component configured to allow passage of all of the packet-switched (PS) radio bearer (RB) non-zero PDU TFCs in the MinTFC set to the physical layer according to a corresponding TFC state when the MRAB MinTFC condition is determined not to exist.

41. The apparatus of claim 40, wherein the TFC controlling component further comprises at least one component configured to allow all TFCs outside of the MinTFC set to pass to the physical layer.

42. The apparatus of claim 37, wherein the TFC controlling component further comprises at least one component configured to block data related to the at least one TFC outside of the MinTFC set from passing to a physical layer when the UE is operating in the MRAB MinTFC mode, and configured to allow data related to the at least one TFC outside of the MinTFC set to pass to the physical layer when the UE is not operating in the MRAB MinTFC mode.

43. The apparatus of claim 37, wherein the TFC state obtaining component is further configured to obtain a plurality of TFC states for each of substantially all TFCs outside of the MinTFC set.

44. The apparatus of claim 43, wherein the MRAB MinTFC mode determining component is further configured to determine to operate the UE in the MRAB MinTFC mode where the at least a portion of the plurality of TFC states for each of the substantially all TFCs indicate an excess power or blocked state.

45. The apparatus of claim 44, wherein the portion is computed based in part on a specified number, A, of TFC states over a number, B, of the plurality of TFC states.

46. The apparatus of claim 37, wherein the UE is in the MRAB MinTFC mode, and wherein the MRAB MinTFC mode determining component is configured to determine to not operate the UE in the MRAB MinTFC mode where a number, C, of the plurality of TFC states corresponding to successive measurement periods of the at least one TFC indicate a supported state.

47. The apparatus of claim 46, wherein the TFC controlling component is further configured to cease controlling transmission associated with the at least one TFC based on determining to not operate the UE in the MRAB MinTFC mode.

48. The apparatus of claim 37, wherein the TFC state obtaining component is further configured to obtain a plurality of TFC states of the at least one TFC over a plurality of prior successive measurement periods.

\* \* \* \* \*